Nov. 23, 1954   J. W. O'DAY   2,695,195
ANTITHEFT HUBCAP
Filed Jan. 10, 1952

INVENTOR.
JAMES W. O'DAY
BY
*J. G. Cook*
ATTORNEY

United States Patent Office 2,695,195
Patented Nov. 23, 1954

2,695,195
ANTITHEFT HUBCAP
James W. O'Day, Maplewood, Mo.

Application January 10, 1952, Serial No. 265,826

1 Claim. (Cl. 301—108)

My invention consists of an anti-theft hub cap and comprises a detachably mounted hub cap upon an automobile wheel and so secured to the axle of the automobile that it can only be removed by the use of the tool employed in removing a wheel from said axle.

The principal object of the invention is to provide a very secure attaching means that is inexpensive to make and apply to a hub cap. Another object is to eliminate any noise from the device when it is in use. A still further object is to produce expansible attaching means that can be employed on all hub caps of varying diameters. A still further object is to provide securing or attaching means that when and if a hub cap should become detached from the wheel while the automobile is being driven the dragging of the hub cap secured to the attaching strap, which in turn is attached to the axle of the automobile would make sufficient noise to attract the attention of an occupant of the automobile, thus preventing the loss of such hub cap.

Many hub caps are lost or stolen from automobiles because of the ease of detachability of said cap from the automobile and it is the purpose of my invention to prevent the same.

Figure 1:
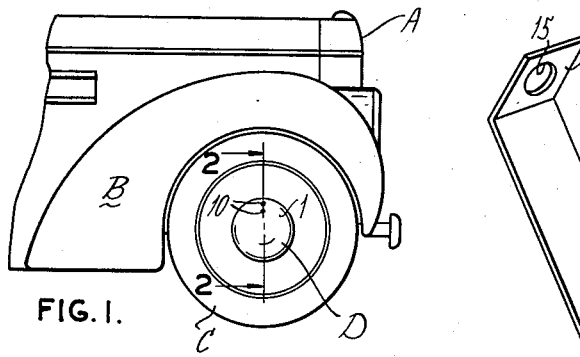
Fig. 1 is a side view of the front end of an automobile, showing a front wheel with a hub cap in position thereon.
Figure 3:
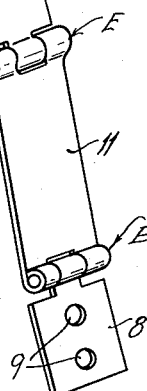
Fig. 3 is an enlarged perspective view of the expansible attaching flexible strap.

Referring to Fig. 1, the forward end of an automobile is designated by A. The fender by B, the wheel by C and the detachable hub cap by D.

Figure 2:
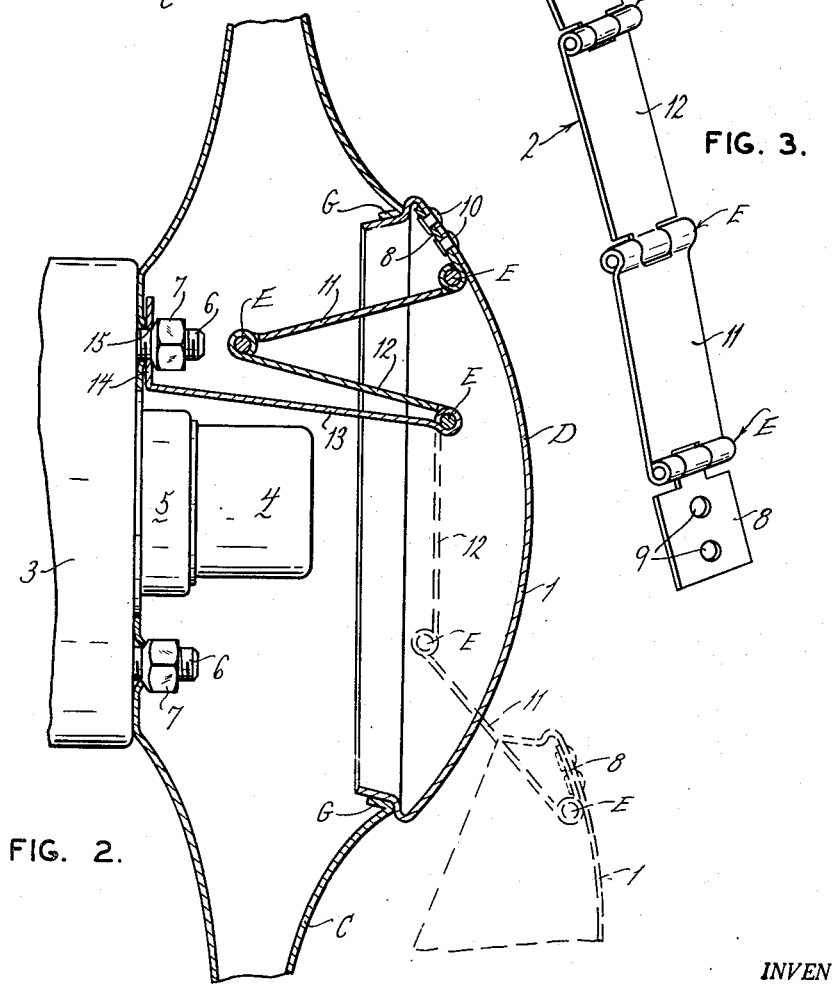
Fig. 2 is an enlarged cross sectional view taken on line 2—2, Fig. 1, showing a portion of a wheel with a hub cap frictionally mounted thereon, in full lines, and in detached position in dotted lines, but still attached to the axle of the automobile.

In Fig. 2 is shown a hub cap 1 of the usual construction, to which is secured, either by rivets, or brazed or welded, a flexible attaching strap 2. The hub cap 1 is frictionally engaged with the central portion of the wheel C, which is mounted upon an axle 3 on the automobile A, which axles on the front end of said automobile have outwardly extending hub portions 4 projecting from a larger portion 5 on said axle 3. On axle 3 are a series of bolts 6 which serve to securely hold the wheel C on said axle 3, when the nuts 7 are screwed upon such bolts 6.

The flexible attaching strap 2 is preferably formed of a series of relatively thin steel sections of rectangular shape, which will now be described. A short end section 8 having rivet holes 9 therethrough to receive rivets 10, which rivets also pass through the outer peripheral portion of the hub cap 1. This section 8 may be brazed or welded to the hub cap 1 instead of being secured thereto by rivets. The purpose is to have a very secure connection between the hub cap 1 and the strap 2 so as to make it quite difficult to forcibly wrench said hub cap from the automobile. To the section 8 is hingedly attached a longer section 11. Another section 12 is hingedly secured to the section 11. A still further section 13 is hingedly secured to the section 12. The hinges are designated by E and such hinges are brazed to prevent tampering therewith. The section 13 has its end portion 14 bent at right angle to the section 13 and has an aperture 15 therethrough to permit the passage therethrough of a bolt 6, when the nut 7 is removed to be replaced when the strap 2 is placed in position on the hub 5.

In operation, the hub cap 1 with the flexible strap 2 securely attached thereto is placed adjacent the central portion of the wheel C. The outer apertured end portion 14 is slipped over the end of a bolt 6, after the wheel C has been mounted upon the axle 3 and bolts 6. At this time the hub cap 1 is in the dependent position shown in dotted lines in Fig. 2. The hub cap 1 is now elevated so as to frictionally engage the central portion of the wheel C. The strap sections 11, 12 and 13 assume the position shown in full lines in Fig. 2, no metal portion contacting any other metal portion. The hub cap 1 is then forced tightly into frictional contact with the flanged portion G of the wheel C, all of the nuts 7 having first been very firmly secured on the bolts 6. Should a thief try to detach a hub cap from a wheel he would require a tire removal wrench and sufficient time to remove the nut securing said hub cap to the wheel, which obviously would not be expedient because of the possibility of detection during such operation. Also the hub cap would show it if the strap 2 was detached therefrom, which would require some explanation of ownership.

It is obvious that the strap 2 may be elongated sufficiently to be attached to all hub caps of whatever diameter in cross section.

I claim:

A hub cap for detachable mounting on a wheel of an automobile, said wheel being mounted on an axle of said automobile for rotation with said axle, securing bolts on said axle for holding said wheel upon said axle, nuts engaging the outer ends of each bolt, an expansible strap formed of a series of rectangular shaped sections hingedly secured together at the contiguous ends of said sections, said strap being permanently secured to said hub cap at one end portion thereof, the other end portion being apertured for detachably mounting said strap upon one of said bolts on said axle, said expansible strap being immovably confined between the wheel and the hub cap in collapsed position when said hub cap is placed upon the wheel, and means for holding said hub cap upon said wheel.

References Cited in the file of this patent
UNITED STATES PATENTS

| Number | Name | Date |
|---|---|---|
| 954,883 | Proshinska | Apr. 12, 1910 |
| 2,085,725 | Briggs | July 6, 1937 |
| 2,601,017 | Herrick | June 17, 1952 |